United States Patent [19]

Ono

[11] Patent Number: 4,734,244

[45] Date of Patent: Mar. 29, 1988

[54] BLOW MOLDING METHOD AND MOLD WITH MEANS TO POSITION AN INSERT

[75] Inventor: Junichi Ono, Kanagawa, Japan

[73] Assignee: Ikeda Bussan Co., Ltd., Ayase, Japan

[21] Appl. No.: 812,011

[22] Filed: Dec. 23, 1985

[30] Foreign Application Priority Data

Feb. 27, 1985 [JP] Japan .............................. 60-27730[U]

[51] Int. Cl.⁴ ...................... B29C 49/48; B29C 49/04
[52] U.S. Cl. ..................................... 264/515; 249/97; 425/113; 425/116; 425/121; 425/522; 425/532
[58] Field of Search .................. 425/117, 126 R, 112, 425/113, 116, 121, 522, 532, 123; 264/515, 516; 249/97

[56] References Cited

U.S. PATENT DOCUMENTS

| | | | |
|---|---|---|---|
| 2,372,917 | 4/1945 | Tuttle | 425/522 |
| 3,162,707 | 12/1964 | Scott et al. | 425/532 |
| 3,275,726 | 9/1966 | Rudolph | 425/532 |
| 3,328,498 | 6/1967 | Cheney | 425/532 |
| 3,394,209 | 7/1968 | Cheney | 425/532 |
| 3,438,085 | 4/1969 | Larkin | 425/522 |
| 3,632,263 | 1/1972 | Blanchard | 425/532 |
| 4,176,153 | 11/1979 | Weiler et al. | 425/522 |

FOREIGN PATENT DOCUMENTS

| | | | |
|---|---|---|---|
| 47-36497 | 9/1972 | Japan . | |
| 48-60153 | 8/1973 | Japan . | |
| 50-25513 | 8/1975 | Japan . | |
| 51-145569 | 12/1976 | Japan . | |
| 0109328 | 6/1984 | Japan | 264/516 |
| 59-27695 | 7/1984 | Japan . | |

Primary Examiner—Willard E. Hoag
Attorney, Agent, or Firm—Schwartz, Jeffery, Schwaab, Mack, Blumenthal & Evans

[57] ABSTRACT

Mold and method for molding a plastic headrest core member which has an insert partially embedded therein. The mold comprises two halves one of which is integrally formed at its shaped inner surface with a projection which is constructed and arranged to contact an end of the insert to suppress undesirable inward movement of the same during cooling of the molded headrest core member in the closed mold.

13 Claims, 6 Drawing Figures

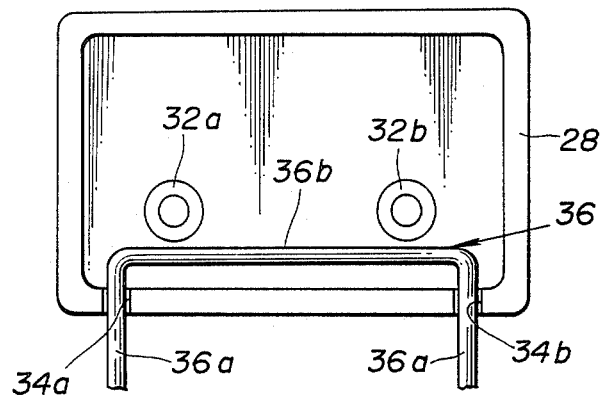
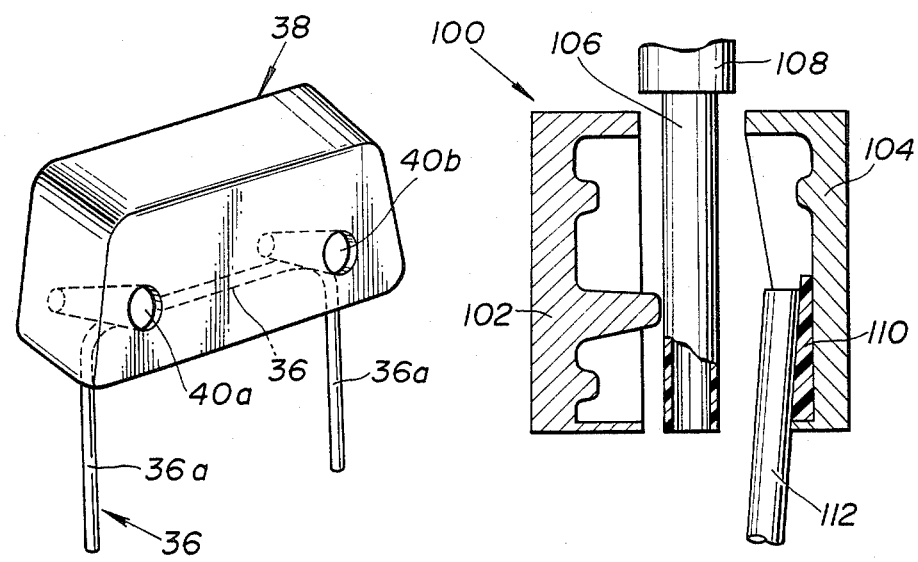

BLOW MOLDING METHOD AND MOLD WITH MEANS TO POSITION AN INSERT

BACKGROUND OF THE INVENTION

1. Field of the Invention

The present invention relates in general to a mold for molding a plastic object, and more particularly to a dividable mold for molding a plastic hollow object with an insert partially embedded therein.

2. Description of the Prior Art

Hitherto, various kinds of dividable molds have been proposed and put into practical use for molding plastic core members for headrests which are adapted to the seatbacks of an automotive seat. However, some of the hitherto proposed molds have the drawback that during cooling of the molded object is the mold, the insert in the molded object is subjected to dislocation due to the inevitable shrinkage of the same. That is, in some of the conventional molds, it is difficult to provide the insert in the molded object with a precise positioning relative to the mold during the cooling process. One of the conventional molds will be described hereinafter for clarification of the task of the present invention.

SUMMARY OF THE INVENTION

It is therefore an object of the present invention to provide an improved dividable mold which is constructed to suppress or at least minimize the dislocation of the insert even when the molded object shrinks during cooling in the mold.

According to the present invention, there is provided a mold for molding a hollow plastic object which has an insert embedded therein, the mold comprising a first half having a shaped inner surface, a second half having a shaped inner surface, the first and second halves being coupled together, upon requirement, to define therebetween a closed cavity in which a parison from an extruder die is swelled to form the hollow plastic object, and a projection integrally formed on the inner surface of one of the first and second halves, the projection being so constructed and arranged to contact the insert to stop the inward movement of the same relative to the closed cavity.

BRIEF DESCRIPTION OF THE DRAWINGS

Other objects and advantages of the present invention will become apparent from the following description when taken in conjunction with the accompanying drawings, in which:

FIG. 4 is a view taken from the direction of the arrow "IV" of FIG. 3;

FIG. 5 is a perspective view of a hollow core member of a headrest which member is produced by the mold of the second embodiment; and FIG. 6 is a view similar to FIG. 1, but showing a conventional dividable mold.

DESCRIPTION OF A CONVENTIONAL MOLD

Figure 1:
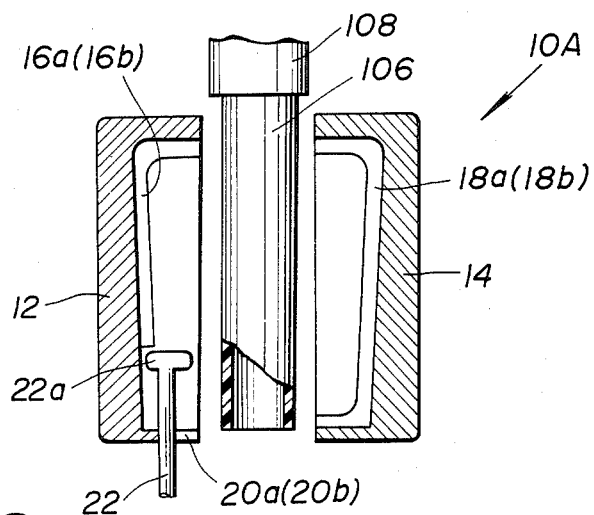
FIG. 1 is a sectional view of two halves of a mold with a parison inserted therebetween, showing a first embodiment of the present invention.

Prior to describing in detail the invention, one conventional mold for producing a headrest core member will be described with reference to FIG. 6 in order to clarify the task of the invention.

In the drawing, there is shown the conventional dividable mold 100 in a condition wherein two halves 102 and 104 thereof are separated with a parison 106 of an extruder die 108 inserted therebetween.

Upon requirement of molding, a heating and thus softened thermoplastic piece 110 (such as a piece constructed of polyethylene, polypropylene, or the like) is set to a given position in the cavity of the half 104 and two stays 112 are inserted into the mold 100 with their upper portions contacts to the softened plastic piece 110. Then, the parison 106 (which is a heated softened plastic tube) is extruded from the die 108 of the extruder into the space defined between the separated halves 102 and 104, in a manner as shown in the drawing. Then, the halves 102 and 104 are tightly coupled together cutting the parison 106 and thus confining the same in the closed mold 100. During this, suitable numbers of air injection needles (not shown) secured to each half 102 or 104 are forced to stick into the parison 106 and then pressurized air is blown into the parison 106 through the needles. With this operation, the softened parison is swelled and lined on the shaped inner surfaces of the mold 100 and merged with the plastic piece 110. After the molded object in the mold 100 is cooled sufficiently, the halves 102 and 104 are uncoupled and the finished mold hollow object is taken out therefrom.

However, the above-mentioned conventional mold 100 suffers from the problem that during cooling of the molded core member in the mold 100, the stays 112 are pulled into the molded core member due to the inevitable shrinkage of the same which causes dimensional deterioration of the finished molded core member.

For solving this problem, a measure is proposed by Japanese Patent Application Second Provisional Publication No. 59-27695. In this measure, the stays 112 are formed with respective recesses. Upon molding, suitable stopper members mounted to one of the halves 102 and 104 are brought into locking engagement with the recesses of the stays 112 to suppress the undesirable dislocation of the stays 112. However, as is easily understood, the provision of the recesses in the stays deteriorates the external appearance of the finished product, and increases the cost of the product.

DETAILED DESCRIPTION OF THE INVENTION

Figure 2:
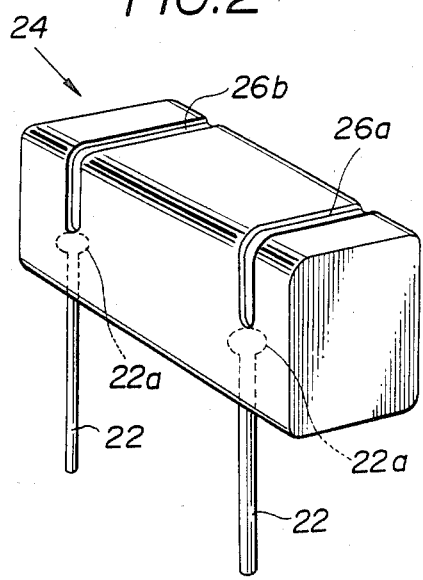
FIG. 2 is a perspective view of a hollow core member of a headrest which member is produced by the mold of the first embodiment.

Referring to FIGS. 1 to 2, there is shown a first embodiment of the prsent invention, which is free of the above-mentioned drawback. The mold 10A of this embodiment comprises two halves 12 and 14 each having a cavity bounded with a suitably shaped inner surface. Each half 12 and 14 is formed at the inner surface thereof with two parallel ribs 16a and 16b (or 18a and 18b). The ribs 16a and 16b of the half 12 terminate at the positions near the lower edge of the same where two spaced recesses 20a and 20b are formed. As will be understood as the description proceeds, the ribs 16a 16b, 18a and 18b function to provide the molded object with two parallel grooves (26a and 26b).

Upon requirement of molding, the halves 12 and 14 are so arranged that the parallel ribs 16a, 16b, 18a and 18b extend in the direction parallel to the direction in which the parison 106 from the extruder die 108 extends, and the halves 12 and 14 are separated. The two stays 22 are put in the recesses 20a and 20b having their enlarged upper ends or heads 22a located very near the terminating ends of the ribs 16a and 16b. Then, the parison 106 is extruded from the extruder die 108 into the space defined between the separated halves 10. Then, the halves 12 and 14 are coupled together cutting the parison 106 and thus confining the parison in the closed mold 10A. Then, like in the case of the above-mentioned conventional one, pressurized air is fed into the parison through the air injection needles (not shown) to swell the same. With this, the softened plastics of the parison 106 is lined on the shaped inner surfaces of the closed mold 10A. After the molded object in the mold 10A is cooled sufficiently, the halves 12 and 14 are uncoupled and the finished molded hollow object, that is, the headrest core member shown in FIG. 2 is taken out therefrom. By the provision of the ribs 16a, 16b, 18a and 18b on the mold 10A, two grooves 26a and 26b are formed in the molded object, as shown.

Like in the case of the above-mentioned conventional mold 100, shrinkage of the molded object 24 occurs inevitably during cooling of the same in the closed mold 10A, so that the stays 22 are pulled inwardly by the object. However, in the present invention, the terminating ends of the ribs 16a and 16b of the half 12 prevent the inward movements of the stays by contacting the heads of the stays 22. Thus, the dimensional deterioration of the molded object is not caused or at least minimized.

Figure 3:
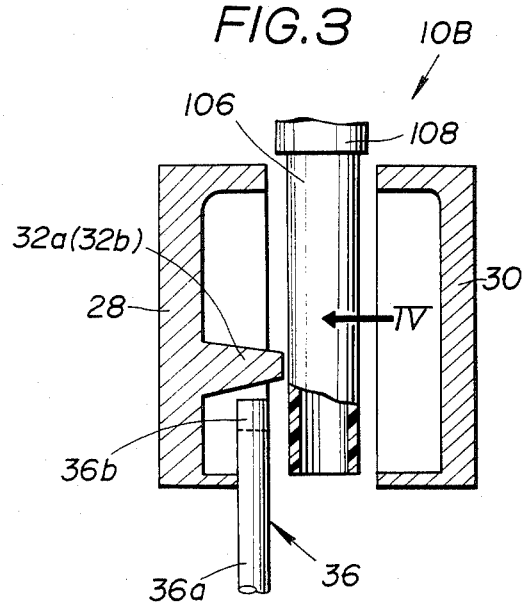
FIG. 3 is a sectional view similar to FIG. 1, but showing a second embodiment of the present invention.

Referring to FIGS. 3 and 4, there is shown a second embodiment of the present invention. The mold 10B of this second embodiment comprises two halves 28 and 30 each having a shaped inner surface. One (for example, the half 28) of the halves is formed at the inner surface thereof with two spaced frusto-conical projections 32a and 32b, as will be well seen from the drawings. The lower edge of the half 28 is formed with two spaced recesses 34a and 34b at the positions near the projections 32a and 32b.

Upon requirement of molding, the halves 28 and 30 are separated and a generally U-shaped stay member 36 is set to the half 28 having it shank portions 36a (see FIG. 4) put in the recesses 34a and 34b and its bridge portion 36b located very close to the conical projections 32a and 32b. Then, the parison 106 is extruded from the extruder die 108 into the uncoupled mold 10B. Then, the halves 28 and 30 are coupled together cutting the parison and thus confining the same in the closed mold 10B. Then, pressurized air is blown into the parison 106 to swell the same through the air injection nozzles (not shown), like in the case of the above-mentioned mold 10A. With this process, the finished molded hollow object, that is, the headrest core member 38 as shown in FIG. 5 is produced. Denoted by numerals 40a and 40b are frustoconical bores formed in the molded object 38, which are caused by the provision of the conical projections 32a and 32b of the mold 10B.

Like in the case of the first embodiment, the undesirable inward movement of the stay member 36, which would otherwise occur during cooling of the molded object 38 in the closed mold 10B, is prevened by the conical projections 32a and 32b with the same reason as mentioned hereinabove.

As is understood from the above description, the mold of the present invention is integrally formed with projections, such as ribs and conical projections, for suppressing the undesirable inward movement of the stays or the stay member during cooling of the molded object in the closed mold. Thus, the undesirable dimensional deterioration of the finished molded hollow object, which would occur in the aforementioned conventional mold 100, is not induced or at least minimized.

As hereinafter used, by "axial end" of an insert is meant an end surface through which a axis of the insert or a portion of the insert would pass.

What is claimed is:

1. A method for molding a hollow plastic object which has an insert embedded therein, comprising the following steps:
    (a) preparing a mold which includes first and second halves, each having a recessed inner surface leaving a side wall, a projection integrally formed on the inner surface of the first half at a position near a recess formed at a portion of said side wall;
    (b) positioning an axial end of said insert adjacent said projection so that a surface of said projection faces said axial end of said insert;
    (c) extruding a parison from an extruder die into a space defined between said first and second halves;
    (d) coupling said first and second halves together, confining said parison in an enclosed cavity defined by the coupled first and second halves; and
    (e) feeding pressurized air into the parison to swell the parison in the enclosed cavity, causing softened plastics of the parison to be lined on the recessed inner surfaces of the coupled halves while said projection prevents inward axial movement of said insert during cooling of the molded object.

2. A method as claimed in claim 1, further comprising the following steps:
    (f) cooling said first and second halves; and
    (g) uncoupling the halves from releasing the molded product therefrom.

3. A mold for molding a hollow plastic object which has an insert embedded therein, comprising:
    a first half having a shaped inner surface;
    a second half having a shaped inner surface, said first and second halves having longitudinal and lateral sides, the respective longitudinal sides of said first and second halves being engageable with each other to define therebetween a closed cavity in which a parison from an extruder die is swelled to form the hollow plastic object;
    means for receiving the insert including a longitudinal recess formed at a lateral side of one of said first and second halves; and
    a projection integrally formed on the inner surface of one of said halves, said projection defining an abutment positioned to abut an axial end of the insert in said recess upon molding of the object to prevent longitudinal movement inwardly into the closed cavity of the insert during cooling of the molded object.

4. A mold as claimed in claim 3, in which said projection comprises a rib which extends along the shaped inner surface of the selected half, said rib terminating at a position near an edge portion of the selected half.

5. A mold as claimed in claim 4, in which the other half is also formed with a rib which extends along the shaped inner surface of the other half, the rib of the selected half and the rib of the other half are mated when the two halves are coupled together.

6. A mold as claimed in claim 3, in which said projection comprises at least one conical projection which projects from the shaped inner surface of the selected half.

7. A mold as claimed in claim 6, wherein the recess which is positioned upon the selected half is formed at one edge portion near the conical projection.

8. A mold as claimed in claim 7, in which said conical projection is tapared toward the top thereof.

9. A mold for molding a headrest core member of plastics which has two stays each being partially embedded therein, comprising:
   a first half having a shaped inner surface;
   a second half having a shaped inner surface, said first and second halves being coupled, upon requirement, to define therebetween a closed cavity in which a parison from a plastic extruder die is swelled to from the plastic headrest core member;
   an edge portion formed on a selected one of said first and second halves and having two spaced recesses for receiving the two stays; and
   two spaced ribs integrally formed on and extending along the inner surface of one of said first and second halves, each spaced rib being positioned to abut an axial end of one of the stays in one of said recesses to prevent inward movement of the stay.

10. A mold for molding a headrest core member of plastics which has a generally U-shaped stay member partially embedded therein, comprising:
    a first half having a shaped inner surface;
    a second half having a shaped inner surface, said first and second halves being coupled, upon requirement, to define therebetween a closed cavity in which a parison from a plastic extrude die is swelled to form the headrest core member;
    an edge portion formed on one of said first and second halves and having two spaced recesses in which shank portions of the U-shaped stay member are to be received; and
    two spaced conical projections formed on the inner surface of one of said first and second halves at the positions near one edge portion of the selected half, said conical projections being positioned to abut the U-shaped stay member when the stay member is received in the recesses in the axial direction of the shank portions of the stay member so that inward movement of the stay member during molding is prevented.

11. A mold for molding a hollow plastic object which has an insert embedded therein, comprising:
    a first and second half, each having a shaped inner surface, said first and second halves being engageable with each other to form therebetween an enclosed cavity; and
    means for abutting an axial end of the insert intermediate ends of the mold to prevent axial movement of the insert in the direction of said abutting means when the insert is positioned in a recess extending through a wall of the mold.

12. A mold as claimed in claim 11, wherein said stopping means includes a projection formed on the inner surface of one of said first and second halves.

13. A mold as claimed in claim 11, wherein said mold further comprises a means for defining a recess in one of said halves which is adapted to receive therein a portion of said insert upon molding said object.

* * * * *